(12) United States Patent
Chang (10) Patent No.: US 8,072,553 B2
(45) Date of Patent: Dec. 6, 2011

(54) STEREOSCOPIC DISPLAY DEVICE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 122 days.

(21) Appl. No.: 12/730,253

(22) Filed: Mar. 24, 2010

(65) Prior Publication Data

US 2011/0043714 A1 Feb. 24, 2011

(30) Foreign Application Priority Data

Aug. 18, 2009 (CN) .......................... 2009 1 0305758

(51) Int. Cl.
*G02F 1/1335* (2006.01)
*G09G 5/00* (2006.01)

(52) U.S. Cl. ............................................. 349/15; 345/6

(58) Field of Classification Search .................... 349/15; 345/4–6
See application file for complete search history.

(56) References Cited

U.S. PATENT DOCUMENTS

| 5,745,197 A | * | 4/1998 | Leung et al. ..................... 349/77 |
| 7,394,506 B2 | * | 7/2008 | Cirkel et al. ..................... 349/15 |
| 2010/0238366 A1 | * | 9/2010 | Chang et al. ..................... 349/15 |

* cited by examiner

*Primary Examiner* — Uyen Chau N Le
*Assistant Examiner* — Chris Chu
(74) *Attorney, Agent, or Firm* — Altis Law Group, Inc.

(57) ABSTRACT

A stereoscopic display device is provided for displaying a 3-dimentional image including a first slice, a second slice and a third slice arranged in the order written. The stereoscopic display device includes a first LCD, a second LCD, and a number of distance adjusting members between the first and second LCDs. Each distance adjusting member includes two magnetic elements. The two magnetic elements are aligned with each other and fixed to the first and second LCDs, respectively. One of the two magnetic elements is an electromagnet. The two magnetic elements are configured for cooperatively creating repulsion forces and attractive forces applied between the two LCDs such that the first LCD is reciprocally moved relative to the second LCD between a first position where the first LCD displays a contour of the second slice and a second position where the first LCD displays a contour of the third slice.

12 Claims, 9 Drawing Sheets

STEREOSCOPIC DISPLAY DEVICE

BACKGROUND

1. Technical Field

The present disclosure relates to a stereoscopic display device.

2. Description of Related Art

Objects are seen in three dimensions because light reflects from them and generates a light field in space.

Stereoscopic imaging is one technique utilized to simulate 3-D images to viewers. Stereoscopic displays work by providing differing yet corresponding perspective images of the same object or scene to the left and right eye of the viewer. Typically, stereoscopic imaging systems utilize special parallax barrier screens: headgear or eyewear to insure that the left eye sees only the left eye perspective and the right eye sees only the right eye perspective.

U.S. Pat. No. 5,745,197 issued to Leung et al, discloses a "volumetric" display intended to provide a type of 3-D images. The Leung et al. volumetric display utilizes a physical deconstruction of a 3-D object that entails "slicing" the object into pieces by planes oriented perpendicular to the view path of the viewer. Images corresponding to the resulting slices are then displayed superimposed on a stack of transmissive display screens (corresponding to the perpendicular slicing planes) layered at sequentially increasing distances from the viewer. This essentially, is 3-D effect created in mechanical fashion. This type of volumetric display requires the layering of two or more transmissive imaging display panels to create the effect of depth, so the depth, number and distance between the various display screens on which the image slices appear limit its 3-D effect necessarily. However, the depth between each two various display screens is changeless such that the display cannot create a good 3-D effect. Additionally, large display screens mean higher associated cost.

Therefore, a stereoscopic display device that can overcome the above-mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
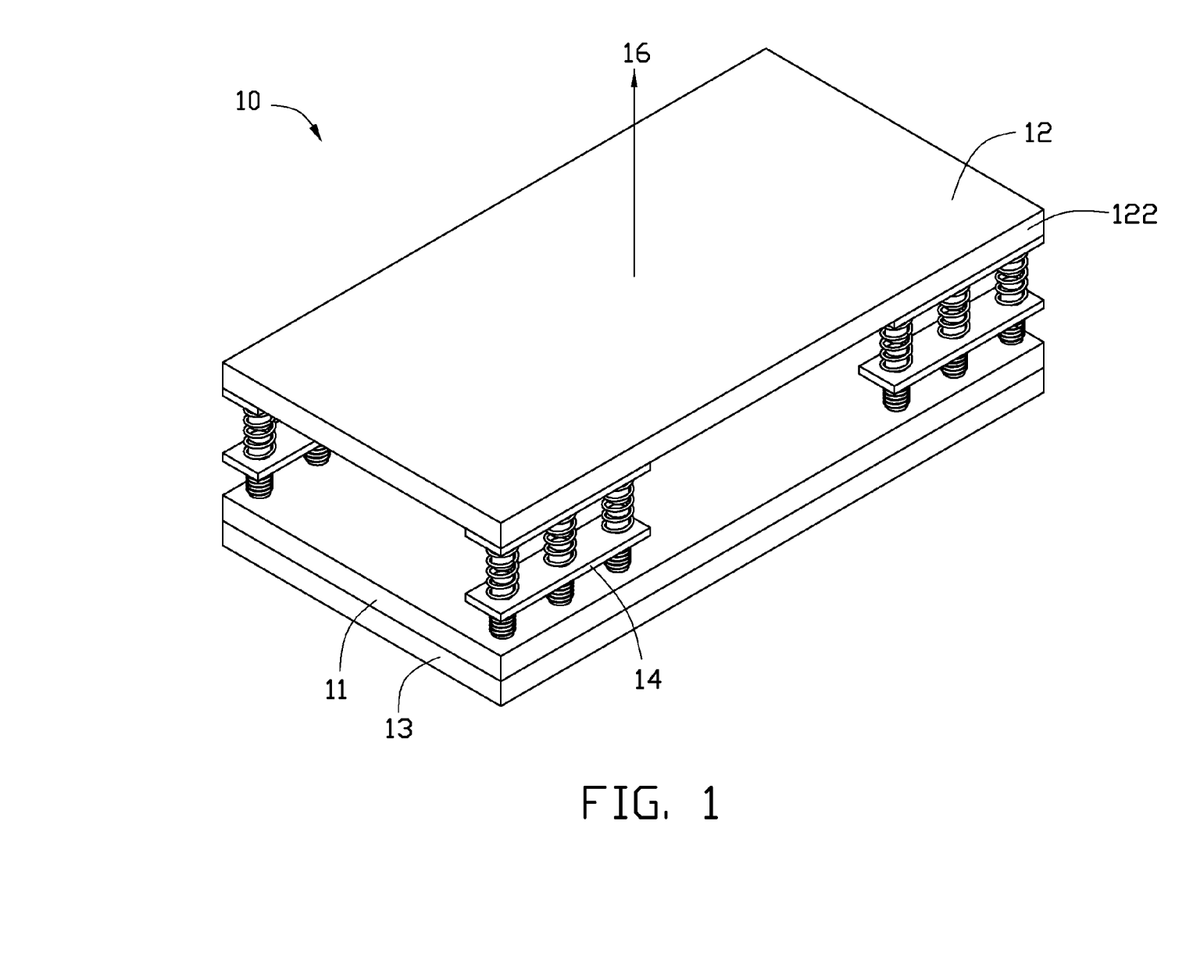
FIG. 1 is a schematic, isometric view of a stereoscopic display device in accordance with a first exemplary embodiment, the stereoscopic display device including a first LCD, a second LCD, and four distance adjusting members.

Referring to FIG. 1, a stereoscopic display device 10 in accordance with a first exemplary embodiment includes a first LCD 11, a second LCD 12, a backlight module 13, and four distance adjusting members 14. The backlight module 13 is arranged adjacent to one surface of the first LCD 11 at an opposite side of the first LCD relative to the second LCD 12. The four distance adjusting members 14 are arranged between the first and second LCDs 11 and 12.

The backlight module 13 is configured for providing light source to the first and second LCDs 11 and 12. The backlight module 13 can include a plurality of cold cathode fluorescence lamps and various optical plates, or include a plurality of light emitting diodes and various optical plates, which are known in the art. Light rays emit from the backlight module 13 and are seen from a surface of the second LCD 12, transmit through the first LCD 11, and the second LCD 12 in the described order.

Figure 2:
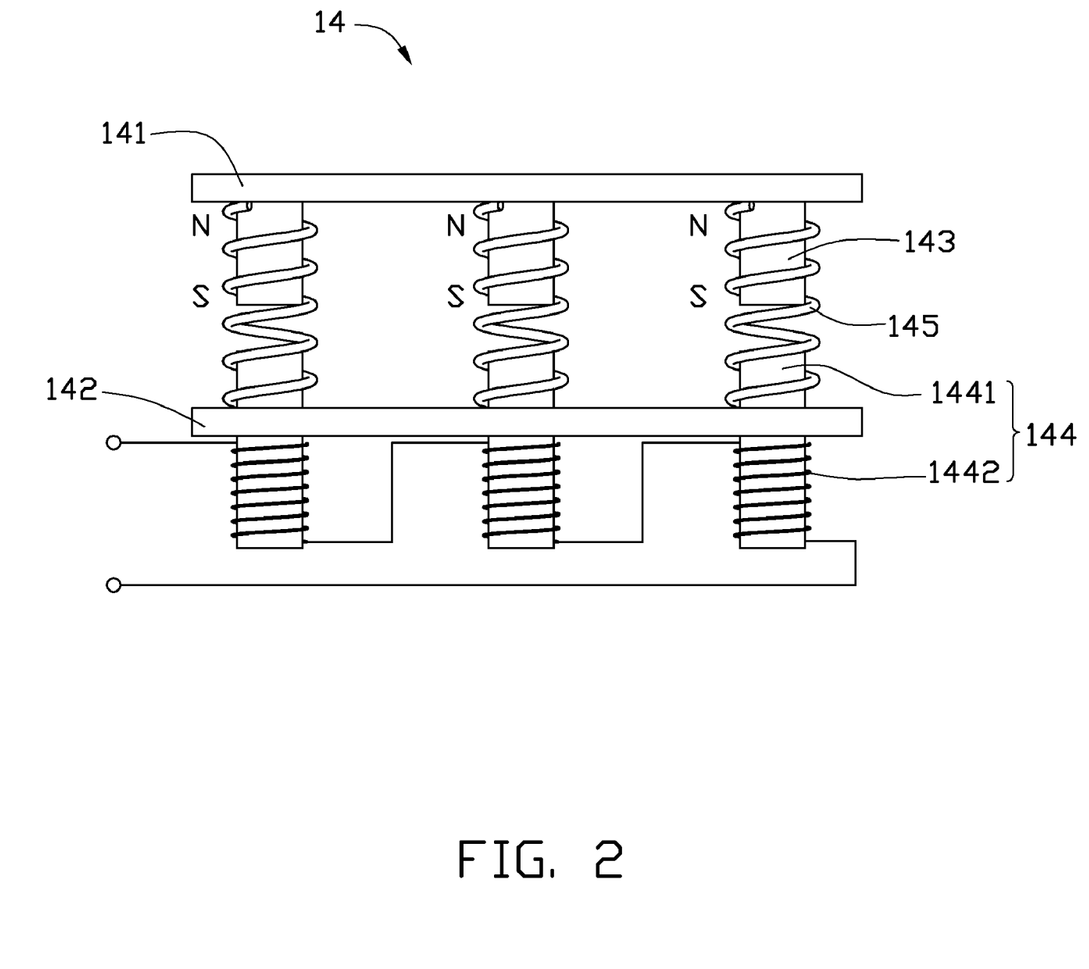
FIG. 2 is sectional view of the distance adjusting member of the stereoscopic display device, showing a light path transmitting through the stereoscopic display device.

Referring also to FIG. 2, the four distance adjusting members 14 are arranged adjacent to four corners of the first and second LCDs 11 and 12. Each of the distance adjusting members 14 includes a first plate 141, a second plate 142, three first magnetic elements 143, three second magnetic elements 144 and three coil springs 145.

The first plate 141 is fixed on a surface of the second LCD 12 between the first LCD 11 and the second LCD 12. The first plate 141 has an elongated shape extending parallel to an edge 122 of the second LCD 12. The three first magnetic elements 143 are columnar and fixed on the first plate 141. The three first magnetic elements 143 are arranged along the extension direction of the first plate 141. Distances between adjacent magnetic elements 143 are equal. The distance between the adjacent magnetic elements 143, are in a range from 1 mm to 10 mm. Each of the first magnetic elements 143 extends toward the second LCD 12 along a direction substantially perpendicular to the second LCD 12. In this embodiment, the first magnetic elements 143 are permanent magnets. Each of the first magnetic elements 143 has an N-pole adjacent to the second LCD 12 and an opposite S-pole.

The second plate 142 is arranged facing the first plate 141. In this embodiment, the second plate 142 is identical to the first plate 141. The second magnetic elements 144 are electromagnets. Each of the second magnetic elements 144 includes a columnar magnetic core 1441 and an electromagnetic coil 1442. In this exemplary embodiment, the columnar magnetic core 1441 is comprised of soft magnetic materials. The columnar magnetic core 1441, perpendicularly penetrates through and fixed to the second plate 142, such that the magnetic core 1441 comprises two parts at two opposite sides of the second plate 142. One end of the magnetic core 1441 is fixed on one surface of the first LCD 11. The electromagnetic coil 1442 winds around the magnetic core 1442 between the first LCD 11 and the second plate 142. Each electromagnetic coil 1442 of the three second magnetic elements 144 has a same winding direction, such as clockwise direction viewing from the end of the magnetic core 1442 adjacent to first LCD 11. Thus, when a coil current is applied to the electromagnetic coil 1442, the three second magnetic elements 144 have a same direction of magnetic field. In this embodiment, the electromagnetic coils 1442 of the three second magnetic elements 144 electrically connect end to end. That is, a single electric wire winds three electromagnetic coil 1442 of the second magnetic elements 144, and a coil current is provided from two ends of the single electric wire.

Each magnetic core 1441 of the second magnetic element 144 is aligned with one corresponding first magnetic element 143. A diameter of each of the first magnetic element 143 and the second magnetic element 144 is smaller than an inner diameter of the coil springs 145. Each the first magnetic elements 143 and a part of the corresponding second magnetic element 144 between the first plate 141 and the second plate 142 are inserted into the corresponding coil spring 145 from opposite ends of the coil spring 145. Two opposite ends of each coil spring 145 contact the first plate 141 and the second end 142, respectively. Preferably, the coil springs 145 are fixed to the first plate 141 and the second plate 142, by adhering. When the coil springs 145 are in their natural state, the adjacent distal ends of the corresponding first and second magnetic elements 143, 144 are spaced from each other. In that case, a distance between the adjacent distal ends of the corresponding first and second magnetic elements 143, 144 is in a range from 1 mm to 10 mm.

Figure 3:
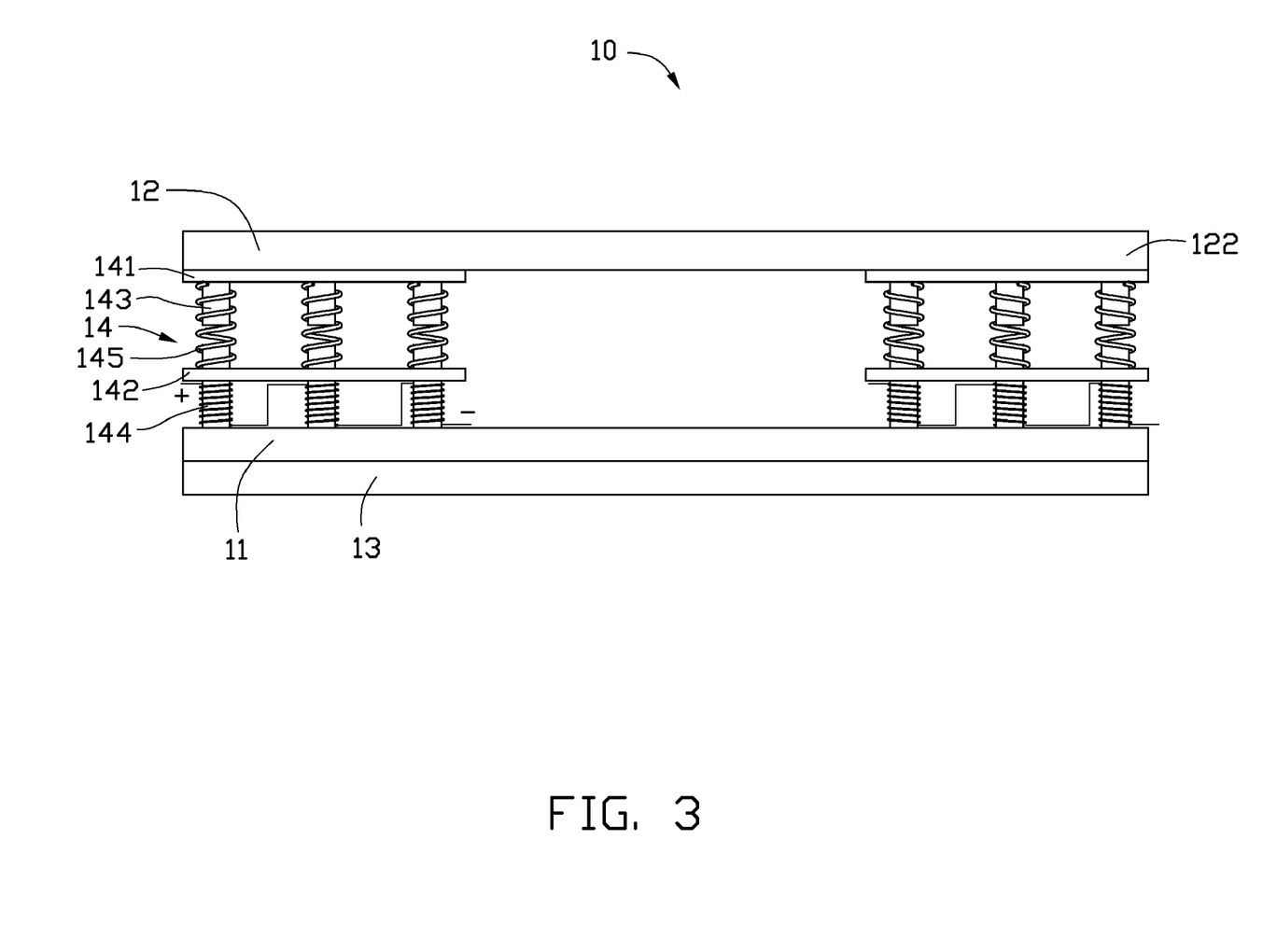
FIG. 3 is a sectional view of the stereoscopic display device in FIG. 1, showing the first LCD close to the second LCD.

Referring to FIG. 3, when a positive coil current is applied to each second magnetic element 144 of the four distance adjusting members 14, each magnetic core 1441 has a S-pole at the distal end adjacent to the first magnetic elements 143. Because the first magnetic elements 143 each have a S-pole adjacent to the corresponding second magnetic elements 144, repulsion forces are generated between the first magnetic element 143 and the corresponding second magnetic elements 144. Thus, the corresponding first and second magnetic elements 143 and 144 begin to move away from each other until the spring forces of the coil springs 145 balance the repulsion forces between the first and second magnetic elements 143 and 144. The first LCD 11 moves along with the second magnetic element 144 and the second LCD 12 moves along with the first magnetic element 143, as the second magnetic element 144 is fixed to the first LCD 11 and the first magnetic element 143 is fixed to the second LCD 12. That is, the first LCD 11 is moved to a first position away from the second LCD 12.

Figure 4:
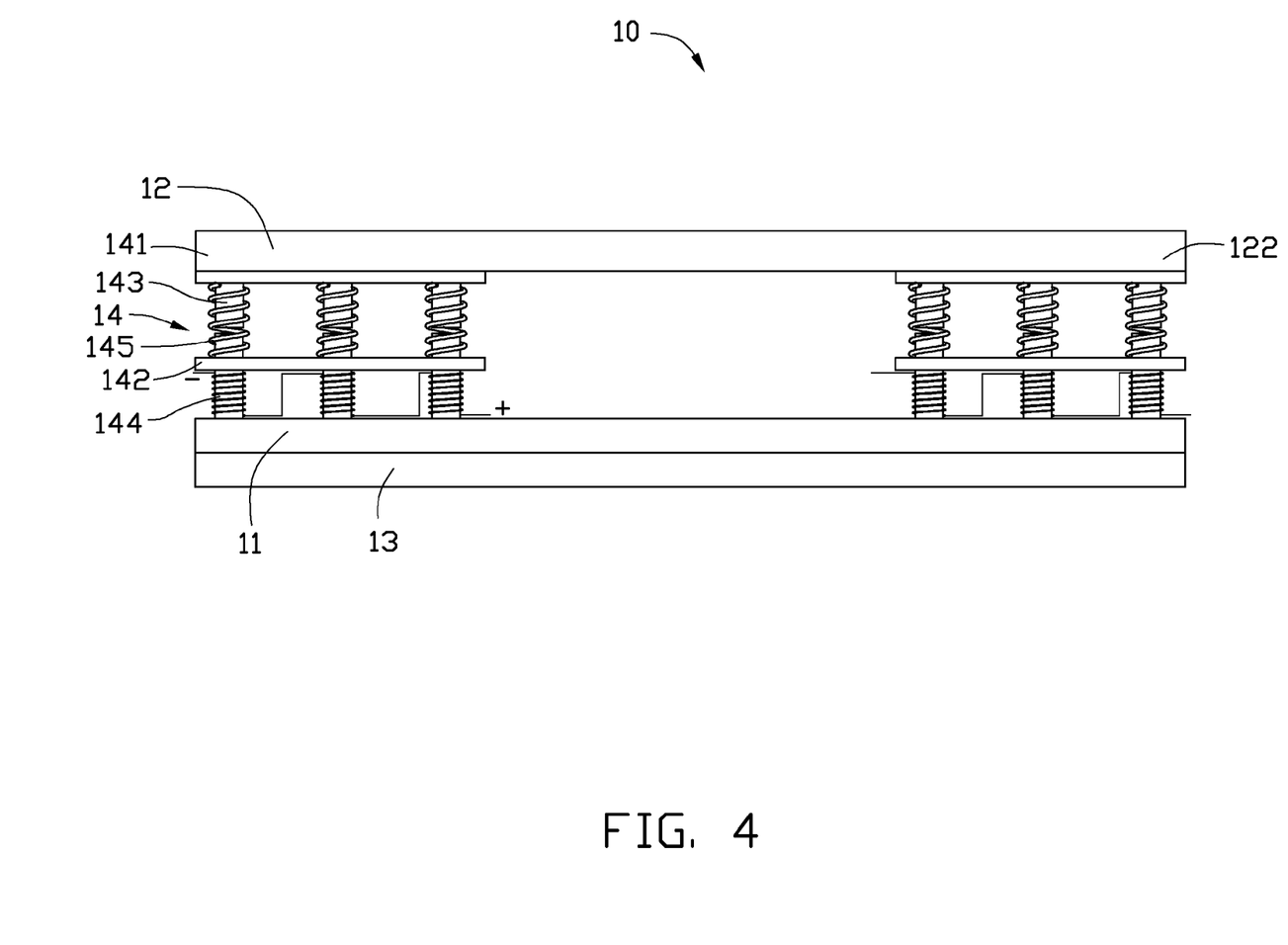
FIG. 4 is a sectional view of the stereoscopic display device in FIG. 1, showing the first LCD far from the second LCD.

Referring to FIG. 4, when a reversed coil current (i.e. negative coil current) with respect to the coil current shown in FIG. 3 is applied to each second magnetic elements 144, each magnetic core 1441 has a N-pole at the distal end thereof adjacent to the corresponding first magnetic element 143. Because the first magnetic elements 143 each have a S-pole adjacent to the corresponding second magnetic elements 144, an attractive force is generated between each first magnetic element 143 and the corresponding second magnetic element 144. Thus, the corresponding first and second magnetic elements 143 and 144 begin to move toward each other until the spring forces of the coil springs 145 balance the attractive forces between the first and second magnetic elements 143, 144. In such case, the first LCD 11 is moved to a second position close to the second LCD 12.

The spring force of each the coil springs 145 corresponds to a length thereof. The repulsion force and the attractive force between the first and second magnetic elements 143, 144 are determined by intensity of the magnetic fields. Since the first magnetic elements 143 are permanent magnets, the repulsion force and the attractive force can be changed by changing the intensity of the magnetic fields of the second magnetic elements 144. The intensity of the magnetic fields of the second magnetic elements 144 can be changed via changing the intensity of the electric current applied to the electromagnetic coil 1442. Therefore, the distance between the first LCD 11 and the second LCD 12 can be changed by changing the intensity and direction of the coil current applied to each electromagnetic coil 1442.

The number of the distance adjusting members 14 can be two, which are arranged adjacent two opposite sides of the first LCD 11. As such, the first plate 141 and the second plate 142 are parallel with the opposite sides of the first LCD 11. The number of the distance adjusting members 14 can also be three. As such, one of the distance adjusting members 14 is adjacent to one side of the first LCD 11, and the other two are adjacent to an opposite side of the first LCD 11. In addition, the number of the distance adjusting members 14 can also be more than four, as long as the distance between the first LCD 11 and the second LCD 12 can be adjusted.

It is noteworthy that the first magnetic element 143 can also be electromagnet. As such, the second magnetic elements 144 can also be permanent magnets instead of electromagnets. That is, at least one of the first magnetic elements 143 and the second magnetic elements 144 is an electromagnet. Distances between the adjacent first magnetic elements 143 can also be unequal. Additionally, the number of the first magnetic elements 143, and the corresponding second magnetic elements 144 and coil springs 145 can also be less than or more than three.

It is noteworthy that the number of LCDs 11 and 12 can be more than two. Accordingly, more distance adjusting members 14 are arrangeable between two adjacent LCDs to achieve better 3-D display effect.

Figure 5:
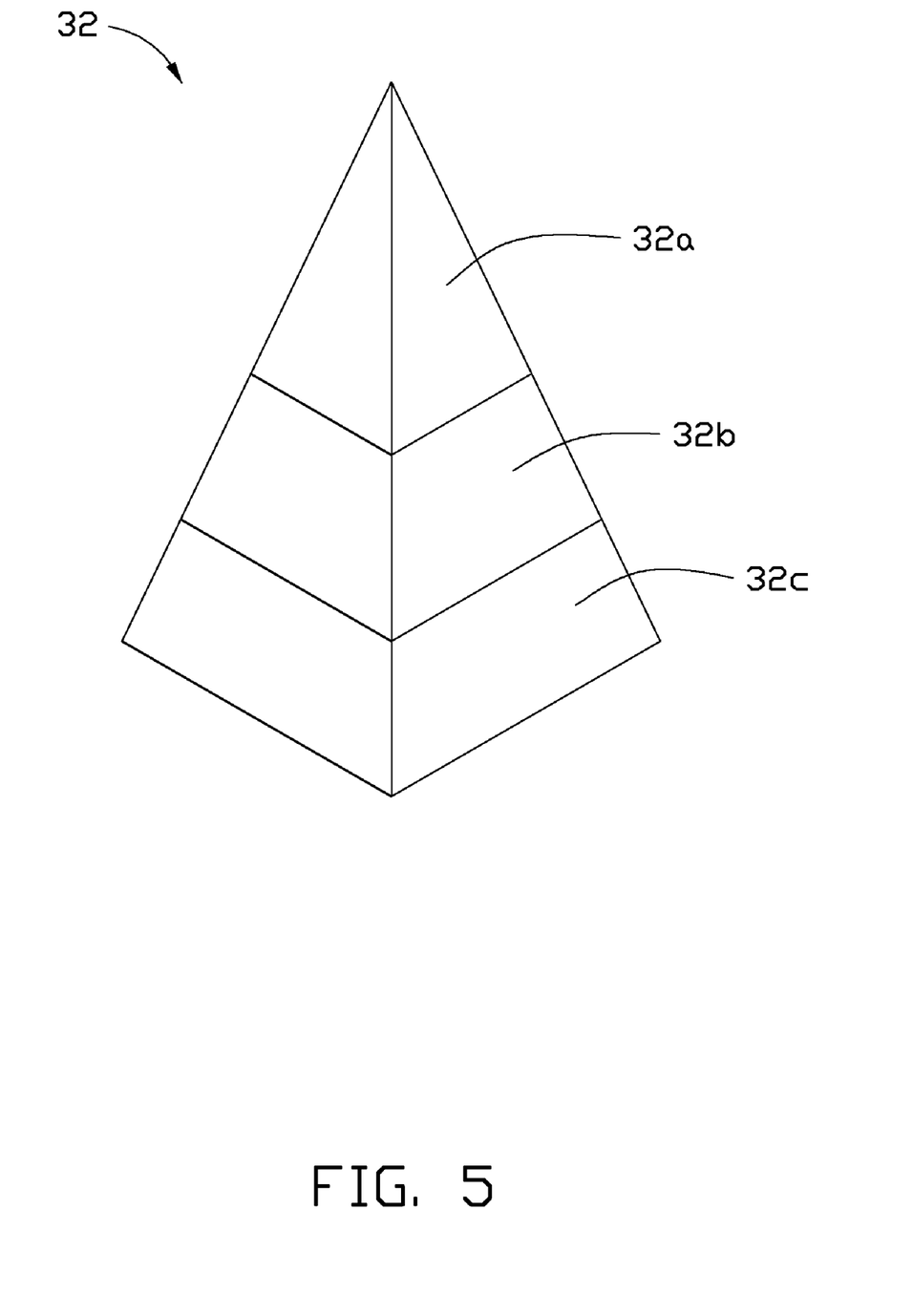
FIG. 5 illustrates a 3-D object partitioned into image slices.
Figure 6:
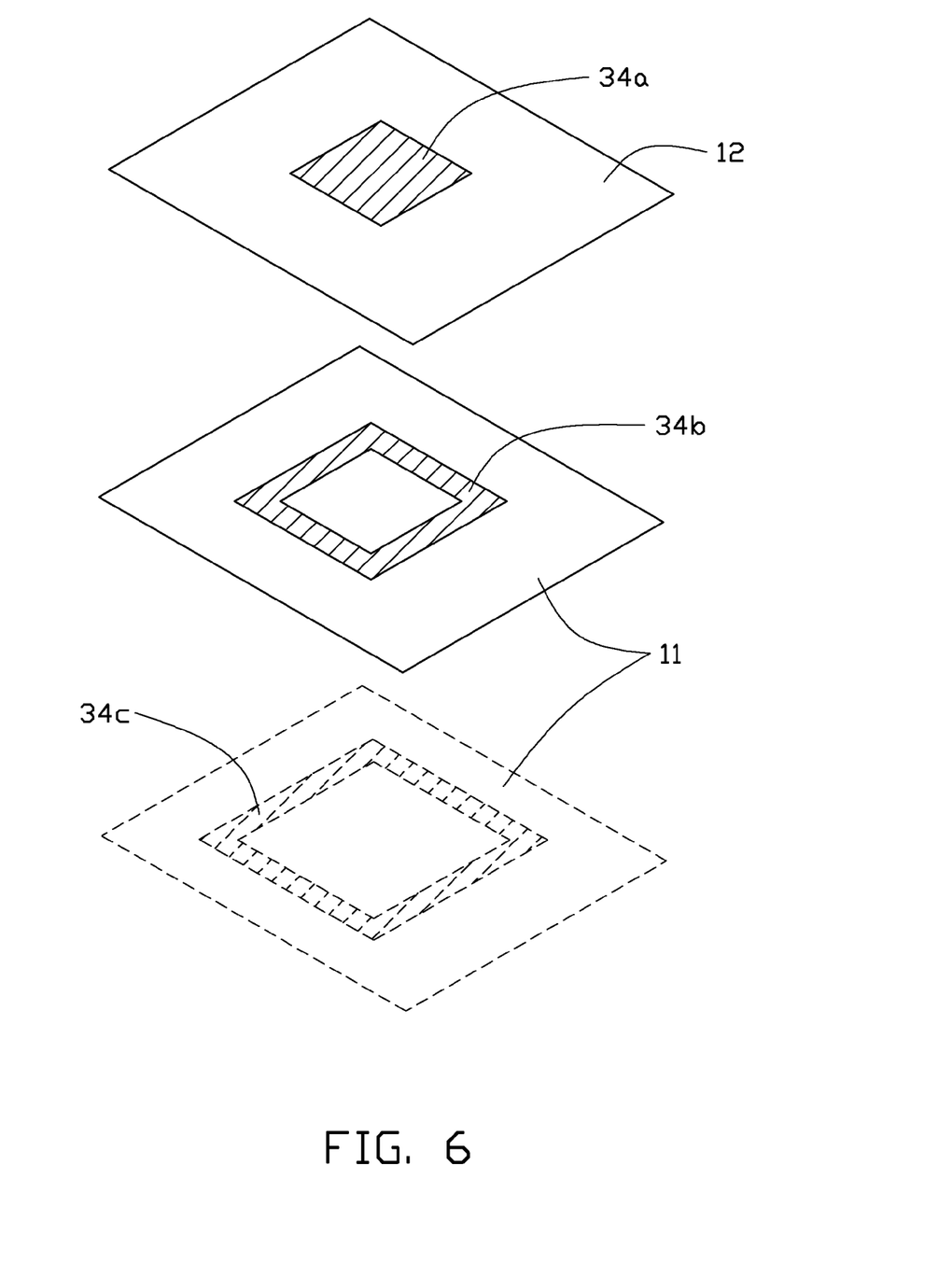
FIG. 6 illustrates the first and second LCDs in FIG. 1 with display slices displaying respective contours of respective image slices.
Figure 7:
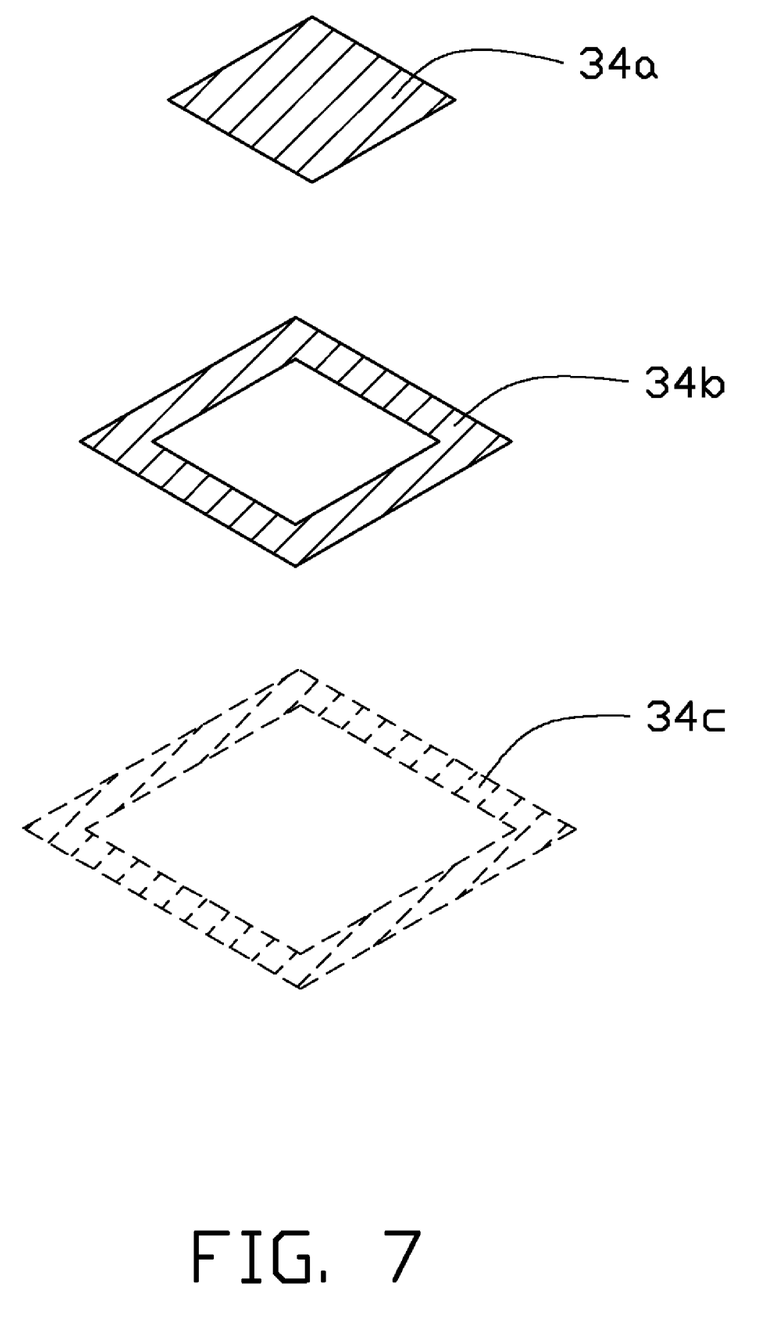
FIG. 7 illustrates the resulting displayed image of displayed contours.

Referring also to FIGS. 5-7, stacking of LCDs 11 and 12 forms the stereoscopic display for viewing a 3-D image 32. The image 32 is shown along image slices 32*a* and 32*b*, through 32*c*, which is lying orthogonal along a line of sight 16 as shown in FIG. 1, which is perpendicular to the first and second LCDs 11 and 12. The second LCD 12 shows a contour 34*a* correspond to the slice 32*a*, and the first LCD 11 shows contours 34*b* and 34*c* correspond to the slices 32*b* and 32*c*, respectively. Wherein the contour 34*b* is displayed when the first LCD 11 is in the second position as shown in FIG. 4, and the contour 34*c* is displayed when the first LCD 11 is in the first position as shown in FIG. 3. The first LCD 11 is driven by the distance adjusting member 14 from the second position to the first position back and forth in a predetermined frequency. When the predetermined frequency is greater than a certain value, persistence of vision generates in the eyes of the viewer. Generally, the predetermined frequency is at least 60 Hertz. That is, the contours 34*b* and 34*c* can be seen at the same time by the viewer because of persistence of vision in the eyes of the viewer. Therefore, the LCDs 11 and 12 displays representing slices 32*a*, 32*b*, and 32*c* of the 3-D image 32 respectively. When viewed as a stack, as shown in FIG. 7, the contours 34*a* and 34*b* through 34*c*, appear to a viewer as a solid 3-D contour image 34 comprising superimposed contour slices 34*a*, 34*b* and 34*c*.

The stereoscopic display device 10 includes two working modes described as follows. One of the two working modes is called, page-flipping mode. In this mode, the second LCD 12, the first LCD 11 at a second position, and the first LCD 11 at a first position display by turns in a predetermined frequency. At a time, only one of the LCDs 11 and 12 displays its corresponding image. When the first LCD 11 displays an image, the second LCD 12 is in a light-pervious state. For utilizing persistence of vision in the eyes of the viewer, the predetermined frequency is higher than a certain value, generally 60 hertz. Thus, the stereoscopic display device 10 can display a solid 3-D contour image comprising superimposed contour slices displayed by the second LCD 12 and the first LCD 11.

The other one of the two working modes is that the second LCD 12 displays its corresponding contour image all along, and the first LCD 11 displays its corresponding contour images at different positions by turns in a predetermined frequency. A portion of the first LCD 11 aligned with the contour images displayed by the first LCD 11 is in a light-pervious state. Thus, the stereoscopic display device 10 can display a solid 3-D contour image comprising superimposed contour slices displayed by the second LCD 12 and the first LCD 11.

It is noteworthy that the 3-D image 32 can also be partitioned into more than three slices. Accordingly, the second LCD 12 displays the top slice, and the first LCD 11 displays the other slices. In that case, more positions are defined when the first LCD 11 is driven to move from a position close to the second LCD 12 to another position far away from the second LCD 12.

The stereoscopic display device 10 includes two LCDs 11 and 12 with an adjustable distance therebetween. Thus, the stereoscopic display device 10 can display different depths of an image by changing the distance between the two LCDs 11, 12, thereby achieving better 3-D display effect. In addition, in the stereoscopic display device 10 of this embodiment, there is no need to arrange too many LCDs to display different depths.

The stereoscopic display device 10 can also have another working mode. In such working mode, the 3-D image 32 is partitioned into two slices, one of which is displayed by the first LCD 11 and the other one is displayed by the second LCD 12. When another 3-D image with a larger depth or a smaller depth needs to be displayed, the first LCD 11 can be driven to a position away from or close to the second LCD 12. Thus, the stereoscopic display device 10 can display 3-D images with different depths.

Figure 8:
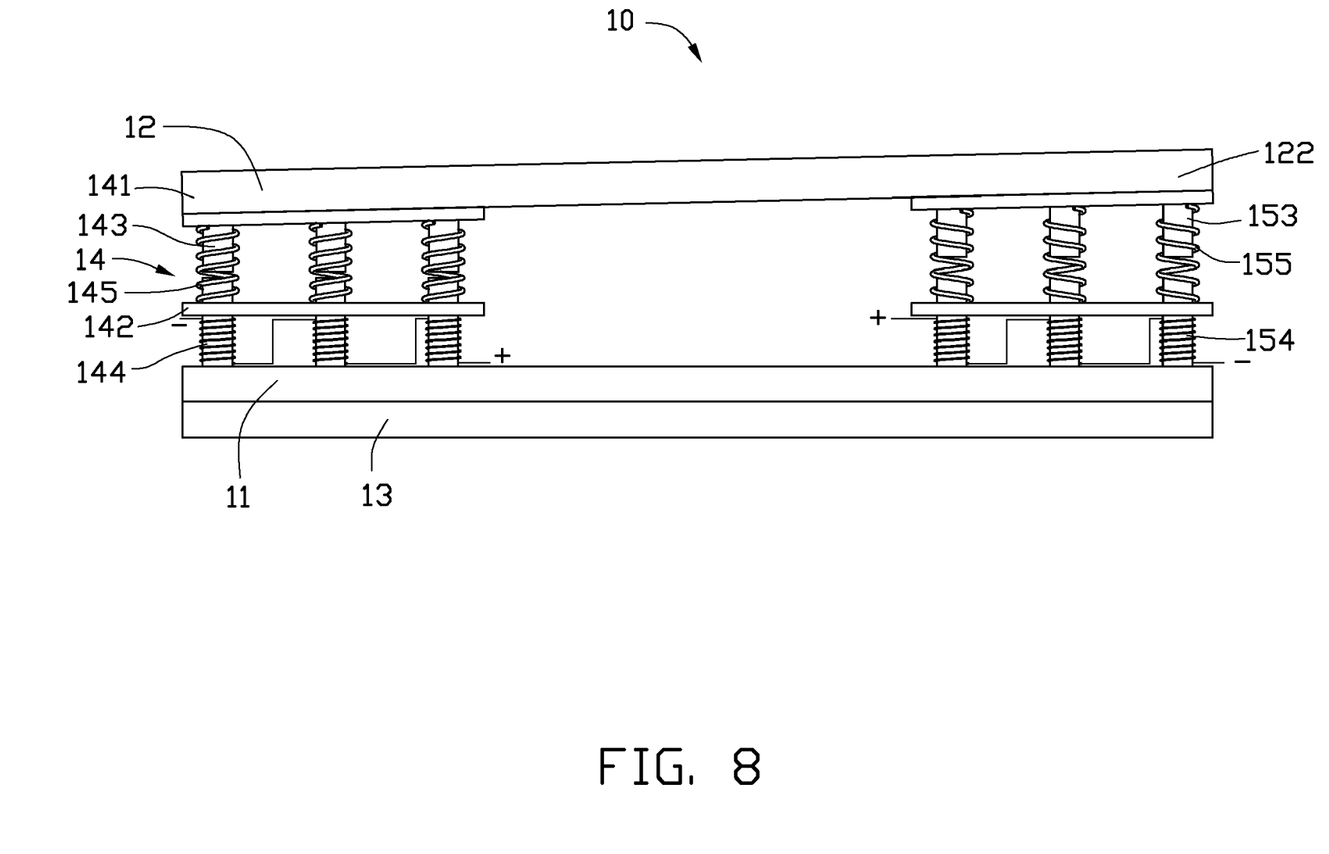
FIG. 8 is a sectional view of the stereoscopic display device in FIG. 1, showing the first LCD is inclined to the second LCD.

Referring to FIG. 8, the first LCD 11 is moved to a third position in a manner that the distance between the first LCD 11 and the second LCD 12 is gradually wider from one side to an opposite side of the first LCD 11. This can be realized in a manner such that a negative coil current is applied to the second magnetic elements 144 adjacent to one side of the first LCD 11 and a positive coil current is applied to the second magnetic elements 144 adjacent to the opposite side of the first LCD 11. In that case, the first LCD 11 can display a solid 3-D contour image with a depth gradually larger from one side to an opposite side.

Figure 9:
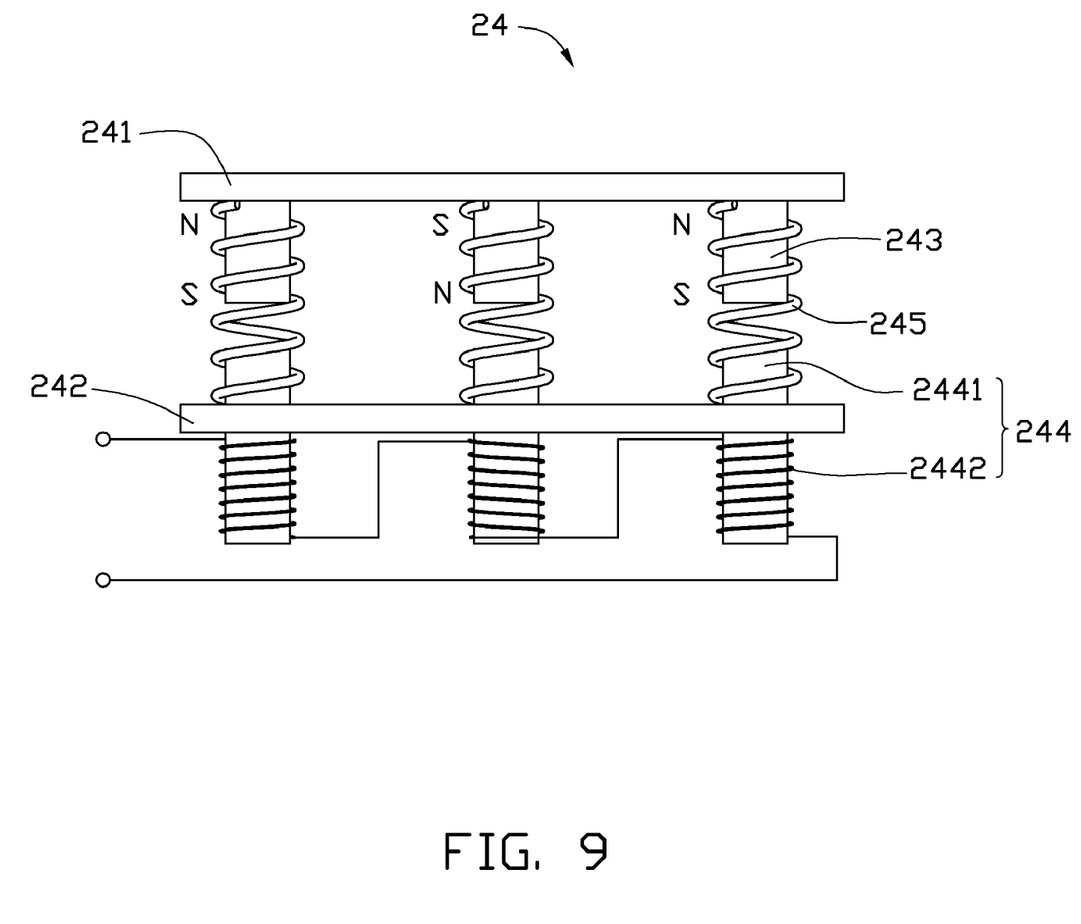
FIG. 9 is a sectional view of a distance adjusting member in accordance with a second exemplary embodiment.

Referring to FIG. 9, a distance adjusting member 24 in accordance with a second exemplary embodiment includes three first plates 241, three second plates 242, three coil springs 245, three first magnetic elements 243, and three second magnetic elements 244. The first plates 241, the second plates 242, and the coil springs 245 are identical to those of the distance adjusting member 14 of the first exemplary embodiment. The three first magnetic elements 243 are different from the first magnetic elements 143 in that each first magnetic element 243 has a direction of magnetic field contrary to that of the adjacent first magnetic element(s) 243. Correspondingly, the three second magnetic elements 244 are different from the second magnetic elements 144 in that each electromagnetic coil 2442 winding around a corresponding magnetic core 2441 has a winding direction contrary to that of the adjacent electromagnetic coil(s) 2442. Thus, forces between the first magnetic elements 243 and the corresponding second magnetic elements 244 have a same direction.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A stereoscopic display device for displaying a 3-dimentional image including a first slice, a second slice and a third slice arranged in the order written, the first, second and third slices parallel to each other, the stereoscopic display device comprising:
   a first liquid crystal display having a first display surface for displaying contours of the second and third slices;
   a second liquid crystal display adjacent to the first display side and spaced from the first liquid crystal display, the second liquid crystal display having a second display surface facing away from the first display side for displaying a contour of the first slice;
   a light source module for illuminating the first and second liquid crystal displays; and
   a plurality of distance adjusting members positioned between the first and second liquid crystal displays, each of the distance adjusting members comprising:
      a first magnetic element with one end fixed to the second liquid crystal display, a second magnetic element with one end fixed to the first liquid crystal display, the other end of the first magnetic element aligned with the other end of the second magnetic element, one of the first and second magnetic elements being an electromagnet, the first and second magnetic elements configured for cooperatively creating repulsion forces and attractive forces applied between the first and second liquid crystal displays such that the first liquid crystal display is reciprocally moved relative to the second liquid crystal display between a first position where the first liquid crystal display displays a contour of the second slice and a second position where the first liquid crystal display displays a contour of the third slice.

2. The stereoscopic display device of claim 1, wherein each of the distance adjusting members further comprises a coil spring, the first and second magnetic elements being columnar and inserted in opposite ends of the coil spring, respectively, two ends of the coil spring being fixed to the first and second liquid crystal displays, respectively.

3. The stereoscopic display device of claim 2, wherein each of the distance adjusting members further comprises a first plate fixing on the second liquid crystal display, the first magnetic element fixed on the first plate, one end of the coil spring being fixed on the first plate.

4. The stereoscopic display device of claim 3, wherein the first magnetic element is a permanent magnet.

5. The stereoscopic display device of claim 3, wherein each of the distance adjusting members further comprises a second plate facing the first plate, the second magnetic element being an electromagnet and comprising a columnar magnetic core and an electromagnetic coil, one end of the columnar magnetic penetrating through the second plate and fixed to the second plate, one end of the columnar magnetic core fixed on the first liquid crystal display and the other end inserted in the coil spring, the electromagnetic coil winding around the columnar magnetic core between the second plate and the first liquid crystal display.

6. The stereoscopic display device of claim 5, wherein the plurality of distance adjusting members comprises four distances adjusting members arranged adjacent to four corners of the first and second liquid crystal displays.

7. The stereoscopic display device of claim 5, wherein the first and second plates each have an elongated shape parallel with one edge of the first liquid crystal display.

8. The stereoscopic display device of claim 2, wherein the first and second magnetic elements are spaced from each other when the coil spring is in a natural length thereof.

9. The stereoscopic display device of claim 8, wherein a distance between the first and second magnetic elements is in a range from 1 mm to 10 mm.

10. The stereoscopic display device of claim 1, wherein the first liquid crystal display is capable of moving toward and away from the second liquid crystal display back and forth in a predetermined frequency.

11. The stereoscopic display device of claim 10, wherein the predetermined frequency is at least 60 hertz.

12. The stereoscopic display device of claim 1, wherein the light source module is arranged adjacent to an opposite side of the first liquid crystal display relative to the second liquid crystal display.

* * * * *